(12) United States Patent
Matsui et al.

(10) Patent No.: US 12,117,645 B2
(45) Date of Patent: *Oct. 15, 2024

(54) MULTICORE OPTICAL FIBER AND DESIGN METHOD

(71) Applicant: Nippon Telegraph and Telephone Corporation, Tokyo (JP)

(72) Inventors: Takashi Matsui, Musashino (JP); Kazuhide Nakajima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,524

(22) Filed: Aug. 10, 2023

(65) Prior Publication Data

US 2024/0027678 A1 Jan. 25, 2024

Related U.S. Application Data

(63) Continuation of application No. 17/422,791, filed as application No. PCT/JP2020/000010 on Jan. 6, 2020, now Pat. No. 11,762,144.

(30) Foreign Application Priority Data

Jan. 18, 2019 (JP) ................................ 2019-006491

(51) Int. Cl.
*G02B 6/02* (2006.01)
*G02B 27/00* (2006.01)

(52) U.S. Cl.
CPC ..... *G02B 6/02042* (2013.01); *G02B 6/02004* (2013.01); *G02B 27/0012* (2013.01)

(58) Field of Classification Search
CPC ............ G02B 6/02004; G02B 6/02042; G02B 27/0012
See application file for complete search history.

(56) References Cited

U.S. PATENT DOCUMENTS 9,103,961 B2 * 8/2015 Li ...................... G02B 6/02042
9,354,387 B2 * 5/2016 Hayashi ............... G02B 6/4201
(Continued)

FOREIGN PATENT DOCUMENTS

JP 2013088458 5/2013

OTHER PUBLICATIONS

Geng et al., "High speed, bidirectional dual-core fiber transmission system for high density, short-reach optical interconnects," SPIE 9390 Next-Generation Optical Networks for Data Centers and Short-Reach Links II, San Francisco, California, Mar. 9, 2015, 939009: 10 pages.

(Continued)

*Primary Examiner* — Ryan A Lepisto
(74) *Attorney, Agent, or Firm* — Fish & Richardson P.C.

(57) ABSTRACT

A multi-core optical fiber includes four cores arranged in a shape along a longitudinal direction, each of the four cores having a step-index type refractive index distribution with a radius, and a cladding region having a lower refractive index than that of each core and a diameter of 125±1 μm and provided on an outer portion of each core. An absolute value of a relative refractive index difference between each core and the cladding region is Δ. The four cores are arranged so that a relationship between a minimum distance from the center of each core to an outer periphery of the cladding region, a minimum value A of spacing between the cores, and the MFD at a set wavelength satisfies a Formula C1, and the radius of each core and the relative refractive index difference Δ between the core and the cladding region are set.

7 Claims, 4 Drawing Sheets

RELATIVE REFRACTIVE INDEX DIFFERENCE

(56) References Cited

U.S. PATENT DOCUMENTS

| | | | | |
|---|---|---|---|---|
| 9,470,841 | B2* | 10/2016 | Bickham | G02B 6/03633 |
| 9,891,378 | B2* | 2/2018 | Imamura | C03B 37/01222 |
| 11,099,321 | B2* | 8/2021 | Chen | G02B 6/0281 |
| 11,422,301 | B2* | 8/2022 | Yamada | G02B 6/4484 |
| 11,467,335 | B2* | 10/2022 | Chen | G02B 6/02042 |
| 11,531,156 | B2* | 12/2022 | Tandon | G02B 6/0365 |
| 11,561,340 | B2* | 1/2023 | Hayashi | G02B 6/02042 |
| 11,762,144 | B2* | 9/2023 | Matsui | G02B 27/0012 |
| | | | | 385/126 |
| 2015/0160408 | A1* | 6/2015 | Bickham | G02B 6/02042 |
| | | | | 385/127 |
| 2022/0026628 | A1* | 1/2022 | Bennett | G02B 6/0281 |
| 2022/0026629 | A1* | 1/2022 | Tandon | G02B 6/02214 |
| 2022/0043201 | A1* | 2/2022 | Bickham | G02B 6/02042 |
| 2022/0120961 | A1 | 4/2022 | Matsui et al. | |
| 2022/0120962 | A1* | 4/2022 | Hayashi | G02B 6/02004 |
| 2022/0120963 | A1 | 4/2022 | Hayashi | |
| 2022/0236492 | A1* | 7/2022 | Correa | G02B 6/4471 |
| 2022/0283362 | A1* | 9/2022 | Bennett | G02B 6/0365 |
| 2022/0413208 | A1* | 12/2022 | Mukasa | G02B 6/0365 |

OTHER PUBLICATIONS

Gonda et al., "125 μm 5-core fibre with heterogeneous design suitable for migration from single-core system to multi-core system," ECOC, Dusseldorf, Sep. 18-22, 2016, pp. 547-549.

Hayashi et al., "Design and fabrication of ultra-low crosstalk and low-loss multi-core fiber," Optics Express, Aug. 15, 2011, 19(17):16576-16592.

Marcuse, "Loss Analysis of Single-Mode Fiber Splices," The Bell System Technical Journal, May-Jun. 1977, 56(5):703-718.

Matsui et al., "118.5 Tbit/s Transmission over 316 km-Long Multi-Core Fiber with Standard Cladding Diameter," CLEO-PR/OECC/PGC, Singapore, 2017, PDP2: 2 pages.

Matsui et al., "Design of 125 μm cladding multi-core fiber with full-band compatibility to conventional single-mode fiber," ECOC, 2015, 0217: 3 pages.

Takahashi et al., "First Demonstration of MC-EDFA-Repeatered SDM Transmission of 40 × 128-Gbit/s PDM QPSK Signals per Core over 6, 160-km 7-core MCF," ECOC Postdeadline Papers, 2012, Th.3.C.4:3 pages.

Winzer et al., "Penalties from In-Band Crosstalk for Advanced Optical Modulation Formats," ECOC Technical Digest, 2011, Tu.5.B.7: 3 pages.

* cited by examiner

FIG. 1(a)
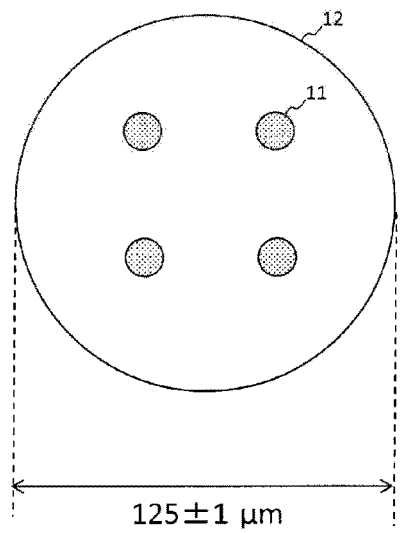
125±1 μm
FIG. 1(b)
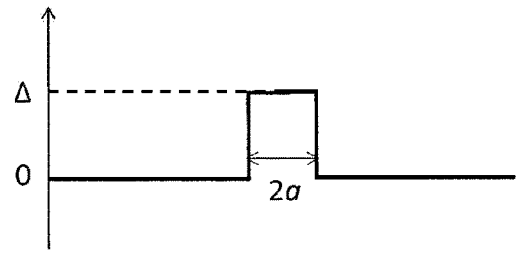
RELATIVE REFRACTIVE INDEX DIFFERENCE
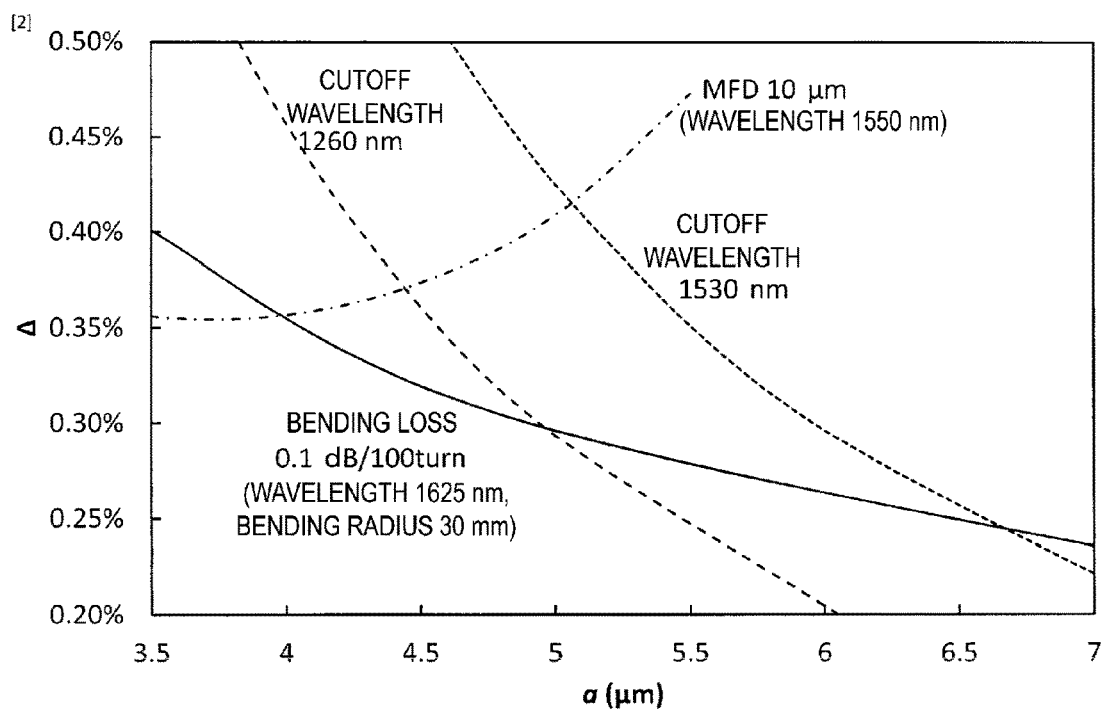
Fig. 2

MULTICORE OPTICAL FIBER AND DESIGN METHOD

CROSS-REFERENCE TO RELATED APPLICATIONS

This application is a continuation application which claims priority to U.S. application Ser. No. 17/422,791, filed Jul. 14, 2021, which claims priority to International Application No. PCT/JP2020/000010, having an International Filing Date of Jan. 6, 2020, which claims priority to Japanese Application Serial No. 2019-006491, filed on Jan. 18, 2019. The disclosure of the prior application is considered part of the disclosure of this application, and is incorporated in its entirety into this application.

TECHNICAL FIELD

The present disclosure relates to a multi-core optical fiber (MCF) including a plurality of core regions and a design method thereof.

BACKGROUND ART

An MCF has been actively studied for exponentially increasing transmission capacity by using a space division multiplexing technique. High-capacity space division multiplexing transmission using an MCF has been frequently reported in, for example, Non Patent Literatures 1 and 2. However, the MCFs shown in many reports, including Non Patent Literatures 1 and 2, have a sufficiently wide core spacing Λ for crosstalk (XT) reduction, so that a cladding diameter is 150 to 230 μm, which is larger than that of an optical fiber in the related art. However, the length of an optical fiber produced from one optical fiber preform becomes shorter in inverse proportion to the square of the cladding diameter. Thus, increasing the cladding diameter significantly deteriorates the productivity of the optical fiber. In addition, existing optical fiber components and the like are designed to support the conventional 125 μm cladding diameter. Thus, the use of the MCF with an enlarged cladding diameter requires a redesign of peripheral components, which requires many researches and developments for practical use.

Accordingly, in recent years, an MCF having a cladding diameter of 125 μm, which is equivalent to the conventional one, has been developed. When the cladding diameter is a standard 125-μm cladding diameter, optical fibers can be mass-produced at or above conventional levels, and an existing peripheral article such as a standard connecting component or an optical cable can be used. Furthermore, because each core of the MCF has the same optical properties as that of the existing optical fiber, it is possible to ensure compatibility with an existing optical interface, and thus existing equipment can be easily upgraded to the MCF.

In Non Patent Literatures 3 and 4, the MCFs having four cores have been reported which have XT of −30 dB or less over 100 km, and have optical properties equivalent to those of existing single mode optical fibers (SMFs). According to Non Patent Literature 3, four cores can be arranged by using the same type of core structure. Moreover, according to Non Patent Literature 5, five cores can be arranged by using a plurality of core structures.

However, because these MCFs have a complex refractive index distribution shape of a trench type as the core structure, the complexity and yield of the process for forming the refractive index distribution are problematic, and there remains a problem with mass production and economy. The standard SMF employs a simple step-index type refractive index distribution, which has high mass productivity and good quality. In Non Patent Literature 6, a two-core fiber has been reported which employs a step-index type refractive index distribution and has a cladding diameter of 125 μm.

CITATION LIST

Non Patent Literature

Non Patent Literature 1: H. Takahashi et al., "First Demonstration of MC-EDFA-Repeatered SDM Transmission of 40×128-Gbit/s PDM-QPSK Signals per Core over 6,160-km 7-core MCF", ECOC2012, Th3C3, September 2012.

Non Patent Literature 2: T. Hayashi et al., "Design and fabrication of ultra-low crosstalk and low-loss multi-core fiber", Opt. Express, vol. 19, pp. 16576-16592, August 2011.

Non Patent Literature 3: T. Matsui et al., "Design of multi-core fiber in 125 μm cladding diameter with full compliance to conventional SMF", ECOC2015, We.1.4.5, September 2015.

Non Patent Literature 4: T. Matsui et al., "118.5 Tbit/s Transmission over 316 km-Long Multi-Core Fiber with Standard Cladding Diameter" OECC2017, PDP2, August 2017.

Non Patent Literature 5: T. Gonda et al., "125 μm 5-core fibre with heterogeneous design suitable for migration from single-core system to multi-core system" ECOC2016, W2B1, September 2016.

Non Patent Literature 6: Y. Geng, et. al., "High Speed, bidirectional dual-core fiber transmission system for high density, short-reach optical interconnects", Photonics West, 9380-8, February 2015.

Non Patent Literature 7: P. J. Winzer et al., "Penalties from In-Band Crosstalk for Advanced Optical Modulation Formats", ECOC2011, Tu5B7, September 2011.

Non Patent Literature 8: D. Marcuse, "Loss analysis of single-mode fiber splices", Bell System Tech. J., vol. 565, no. 5, May-June, 1977.

SUMMARY OF THE INVENTION

Technical Problem

However, arranging three or more step-index type cores with a standard 125-μm cladding diameter is not described in Non Patent Literature 6. In other words, with conventional MCF designs, there is a problem in that it is difficult to arrange three or more step-index type cores with a standard 125-μm cladding diameter. Therefore, in order to solve the problems described above, an object of the present disclosure is to provide a multi-core optical fiber including four step-index type cores with a standard cladding diameter and having excellent mass productivity, quality, and yield while meeting desired specifications, and to provide a design method thereof.

Means for Solving the Problem

In order to achieve the above object, the multi-core optical fiber according to the present disclosure includes four cores arranged in a cladding having a diameter of 125±1 μm based on predetermined relational expressions.

Specifically, a first multi-core optical fiber according to the present disclosure is a multi-core optical fiber including:

four cores arranged in a square lattice shape along a longitudinal direction, each of the four cores having a step-index type refractive index distribution with a radius a; and a cladding region having a lower refractive index than that of each core and a diameter of 125±1 µm and provided on an outer peripheral portion of each core, wherein an absolute value of a relative refractive index difference between each core and the cladding region is $\Delta$, a mode field diameter (MFD) at a wavelength of 1310 nm is 8.2 to 9.6 µm, a bending loss at a wavelength of 1625 nm and a bending radius of 30 mm is 0.1 dB/100 turns or less, a cutoff wavelength is 1260 nm or less, and the four cores are arranged so that a relationship between a minimum distance (OCT) from the center of each core to an outer periphery of the cladding region, a minimum value $\Lambda$ of spacing between the cores, and the MFD at a wavelength of 1310 nm satisfies Formula C1, and the radius a of each core and the relative refractive index difference $\Delta$ between each core and the cladding region are set.

[Formula C1]

$OCT \geq 3.73MFD+3.43$ $\Lambda \leq -5.28MFD+83.54$ (C1)

Further, a second multi-core optical fiber according to the present disclosure is a multi-core optical fiber including: four cores arranged in a square lattice shape along a longitudinal direction, each of the four cores having a step-index type refractive index distribution with a radius a; and a cladding region having a lower refractive index than that of each core and a diameter of 125±1 µm and provided on an outer peripheral portion of each core, wherein an absolute value of a relative refractive index difference between each core and the cladding region being $\Delta$, a mode field diameter MFD at a wavelength of 1550 nm is 9 to 12 µm, a bending loss at a wavelength of 1625 nm and a bending radius of 30 mm is 0.1 dB/100 turns or less, a cutoff wavelength is 1530 nm or less, and the four cores are arranged so that a relationship between a minimum distance (OCT) from the center of each core to an outer periphery of the cladding region, a minimum value $\Lambda$ of spacing between the cores, and the MFD at a wavelength of 1550 nm satisfies Formula C4, and the radius a of each core and the relative refractive index difference $\Delta$ between each core and the cladding region are set.

[Formula C4]

$OCT \geq 2.82MFD+3.7$ $\Lambda \leq -3.99MFD+83.15$ (C4)

The OCT and $\Lambda$ are obtained based on the MFD obtained from the crosstalk per unit length required for the multi-core optical fiber. In addition, the MFD can be achieved by the core radius a and the relative refractive index difference $\Delta$. The multi-core optical fiber is of a step-index type type, and thus, it is excellent in mass productivity, quality, and yield. Accordingly, the present disclosure can provide a multi-core optical fiber including four step-index type cores with a standard cladding diameter and having excellent mass productivity, quality, and yield while meeting desired specifications.

The relationship between the crosstalk per unit length and the MFD is as follows. In the case of the first multi-core optical fiber, a relationship between a total value XT of crosstalk of a unit length at a wavelength of 1625 nm and the MFD at a wavelength of 1310 nm satisfies Formula C2, the crosstalk being received by any core of the cores from other cores, or a relationship between a total value XT of crosstalk of a unit length at a wavelength of 1360 nm and the MFD at a wavelength of 1310 nm satisfies Formula C3, the crosstalk being received by any core of the cores from other cores.

[Formula C2]

$XT \geq 27.0MFD-251.8$ (C2)

[Formula C3]

$XT \geq 33.7MFD-342.3$ (C3)

In the case of the second multi-core optical fiber, a relationship between a total value XT of crosstalk of a unit length at a wavelength of 1625 nm and the MFD at a wavelength of 1550 nm satisfies Formula C5, the crosstalk being received by any core of the cores from other cores, or a relationship between a total value XT of crosstalk of a unit length at a wavelength of 1565 nm and the MFD at a wavelength of 1550 nm satisfies Formula C6, the crosstalk being received by any core of the cores from other cores.

[Formula C5]

$XT \geq 24.6MFD-294.8$ (C5)

[Formula C6]

$XT \geq 26.0MFD-315.8$ (C6)

Furthermore, the first multi-core optical fiber and the second multi-core optical fiber are designed as follows.

According to the present disclosure, a design method of the multi-core optical fiber includes: a specification determination step of determining a cutoff wavelength and a total value XT of crosstalk of a unit length which are required for the multi-core optical fiber, the crosstalk being received by any core of the cores from other cores; a first MFD calculation step of calculating a mode field diameter (MFD) at a wavelength of 1310 nm by using Formula C2 when the cutoff wavelength determined in the specification determination step is 1260 nm or less and the total value XT of the crosstalk of the unit length determined in the specification determination step is a value at a wavelength of 1625 nm, and calculating a mode field diameter (MFD) at a wavelength of 1310 nm by using Formula C3 when the cutoff wavelength determined in the specification determination step is 1260 nm or less and the total value XT of the crosstalk of the unit length determined in the specification determination step is a value at a wavelength of 1360 nm; a first structure calculation step of calculating a minimum distance (OCT) from the center of each core to an outer periphery of the cladding region and a minimum value $\Lambda$ of spacing between the cores by substituting the MFD calculated in the first MFD calculation step into Formula C1; a second MFD calculation step of calculating a mode field diameter (MFD) at a wavelength of 1550 nm by using Formula C5 when the cutoff wavelength determined in the specification determination step is 1530 nm or less and the total value XT of the crosstalk of the unit length determined in the specification determination step is a value at a wavelength of 1625 nm, and calculating a mode field diameter (MFD) at a wavelength of 1550 nm by using Formula C6 when the cutoff wavelength determined in the specification determination step is 1530 nm or less and the total value XT of the crosstalk of the unit length determined in the specification determination step is a value at a wavelength of 1565 nm; and a second structure calculation step of calculating a minimum distance (OCT) from the center of the core to the outer periphery of the cladding region and a minimum value Λ of the spacing between the cores by substituting the MFD calculated in the second MFD calculation step into Formula C4.

Effects of the Invention

The present disclosure can provide a multi-core optical fiber including four step-index type cores with a standard cladding diameter and having excellent mass productivity, quality, and yield while meeting desired specifications, and provide a design method thereof.

BRIEF DESCRIPTION OF DRAWINGS

FIG. 1(a) is a diagram illustrating a cross-sectional structure of a multi-core optical fiber according to the present disclosure. FIG. 1(b) is a diagram illustrating an example of a refractive index distribution of the multi-core optical fiber according to the present disclosure.

FIG. 2 is a structural diagram illustrating an example of a relationship between a core radius and a relative refractive index difference of the multi-core optical fiber according to the present disclosure.

DESCRIPTION OF EMBODIMENTS

Figure 3:
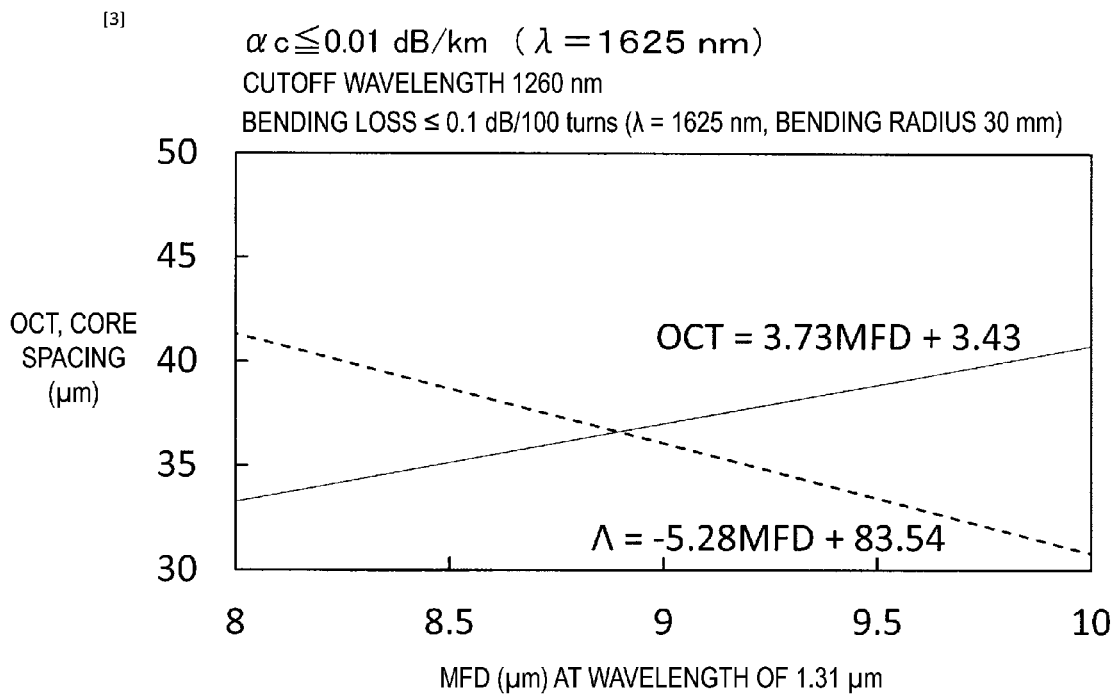
FIG. 3 is a characteristic diagram illustrating a relationship between an MFD, an OCT, and Λ at a wavelength of 1310 nm of the multi-core optical fiber according to the present disclosure.

Embodiments of the present disclosure will be described with reference to the accompanying drawings. The embodiments described below are examples of the present disclosure and the present disclosure is not limited to the embodiments described below. In the present specification and the drawings, components with the same reference signs indicate the same components.

FIG. 1(a) illustrates an example of a structure of a multi-core optical fiber (MCF) of the present embodiment. Specifically, FIG. 1(a) is a cross-sectional structure of the MCF, and FIG. 1(b) is a diagram illustrating a refractive index distribution of each core. The MCF of the present embodiment has four cores 11 in a single optical fiber and the diameter of a cladding region 12 is 125±1 μm, which is standard. FIG. 1(b) illustrates the refractive index distribution of each core in which the cladding region 12 with a lower refractive index than each core 11 is located around the core. Here, a relative refractive index difference is defined based on the refractive index of the cladding region; however, materials for the core and cladding region are selected from a combination of glass materials capable of achieving the refractive index distribution illustrated in FIGS. 1(a) and 1(b), such as pure quartz and fluorine-doped glass, respectively, or $GeO_2$-doped glass and a combination of pure quartz glass and fluorine-doped glass, respectively.

FIG. 2 illustrates a design range of a core parameter for obtaining predetermined optical properties for the multi-core optical fiber of the present disclosure. A horizontal axis indicates a core radius and a vertical axis indicates a core-cladding relative refractive index difference. In a region above the solid line, a bending loss at a wavelength of 1625 nm and a bending radius of 30 mm can be suppressed to 0.1 dB/100 turns or less.

The dashed line and dotted line in the drawing represent relationships between the core radius and the relative refractive index difference, where cutoff wavelengths are 1260 nm and 1530 nm, respectively. Here, cutoff wavelengths of 1260 nm or less and 1530 nm or less can be obtained on the left sides of the dashed line and the dotted line, respectively. Furthermore, the dot-dash line in the drawing represents a relationship between the core radius and the relative refractive index difference in which an MFD at a wavelength of 1550 nm is 10 μm. An MFD of 10 μm or greater can be obtained in a region below the dot-dash line.

Thus, by setting the core radius and the relative refractive index difference in the region surrounded by the solid line, the dotted line (or dashed line), and the dot-dash line in the drawing, it is possible to simultaneously satisfy the desired bending loss, cutoff wavelength, and MFD characteristics. Here, FIG. 2 illustrates, as one example, a case in which the MFD at a wavelength of 1550 nm is 10 μm, but it is known that the relationship between the core radius, the relative refractive index difference, and the MFD in a step-index type optical fiber can be described by the following empirical expression (for example, see Non Patent Literature 8).

(Expression 1)

$$\mathrm{MFD}/2a \approx 0.65 + 1.619 V^{-1.5} + 2.879 V^{-6} \qquad (1)$$

Here, V is a normalized frequency, and is defined by $V \equiv 2\pi a/\lambda (n_1^2 - n_2^2)^{0.5}$ using the core radius a, the refractive index $n_1$ of the core, the refractive index $n_2$ of the cladding, and the wavelength λ.

Accordingly, FIG. 2 can be derived for desired MFD characteristics at any wavelength.

Although the cutoff wavelengths described here are 1260 nm and 1530 nm, these indicate the lower limits of a single mode transmission wavelength band defined by multiple International Standards (for example, ITU-T Recommendation G.652 and G.654, respectively). Moreover, the bending loss and the MFD represent loss characteristics and mutual connectivity after formation of a cable, and are specified in the International Standard, such as ITU-T.

First Embodiment

A first multi-core optical fiber will be described as a first embodiment.

In the MCF, it is necessary to appropriately set a minimum distance (OCT) from the center of a core to an outer periphery of a cladding to sufficiently suppress an excess loss αc. The αc tends to increase on the long wavelength region, and generally it is preferable that the αc be 0.01 dB/km or less at the upper limit wavelength used. FIG. 3 illustrates a relationship between an MFD and an OCT at a wavelength of 1310 nm. Here, as an example, a wavelength band used is set to 1260 nm to 1625 nm. That is, a cutoff wavelength is set to 1260 nm and $\alpha c$ at a wavelength of 1625 nm is set to 0.01 dB/km or less. In addition, a bending loss is set to be the same as that of an existing SMF, and a value at a wavelength of 1625 nm and a bending radius of 30 mm is set to 0.1 dB/100 turns or less.

At this time, as illustrated in FIG. 2, a relationship between the core radius and the relative refractive index difference satisfying the requirements of the cutoff wavelength, the bending loss, and the MFD can be derived. In FIG. 3, the minimum value of the OCT required to set the $\alpha c$ to 0.01 dB/km or less is indicated by the solid line based on conditions of the core radius and the relative refractive index difference satisfying the relationship described above. It can be seen from FIG. 3 that the OCT increases with an increase in the MFD and its relationship can be approximated by the following relational expression.

(Expression 2)

$$OCT \geq 3.73 MFD + 3.43 \quad (2)$$

Here, the dashed line in FIG. 3 represents the upper limit of a center-to-center distance $\Lambda$ of the four cores arranged in a square lattice shape when the cladding diameter is set to 125 μm. It can be seen from FIG. 3 that the relationship between the MFD and $\Lambda$ can be approximated by the following relational expression.

(Expression 3)

$$\Lambda \leq -5.28 MFD + 83.54 \quad (3)$$

Thus, in the MCF of the present application, when the lower limit of the wavelength band used is 1260 nm, the prescribed wavelength of the MFD is 1310 nm, and the $\alpha c$ at a wavelength of 1625 nm is 0.01 dB/km or less, it can be found that setting conditions of the OCT and $\Lambda$ can be determined from the design center value of the MFD by Expressions (2) and (3).

In other words, the first multi-core optical fiber includes four cores arranged in a square lattice shape along a longitudinal direction and each having a step-index type refractive index distribution with a radius a. Further, the first multi-core optical fiber is a multi-core optical fiber including a cladding region on an outer peripheral portion of the cores. The cladding region has a lower refractive index than that of the core and a diameter of 125±1 μm, where an absolute value of a relative refractive index difference between the core and the cladding region is $\Delta$. In the first multi-core optical fiber, a mode field diameter (MFD) at a wavelength of 1310 nm is 8.2 to 9.6 μm. In the first multi-core optical fiber, a bending loss at a wavelength of 1625 nm and a bending radius of 30 mm is 0.1 dB/100 turns or less. In the first multi-core optical fiber, a cutoff wavelength is 1260 nm or less. In the first multi-core optical fiber, the four cores are arranged so that a relationship between a minimum distance (OCT) from the center of each core to the outer periphery of the cladding region, a minimum value $\Lambda$ of spacing of the cores, and the MFD at a wavelength of 1310 nm satisfies Number (2) and Expression (3). In the first multi-core optical fiber, the radius a of the core and the relative refractive index difference $\Delta$ between the core and the cladding region are set.

Figure 4:
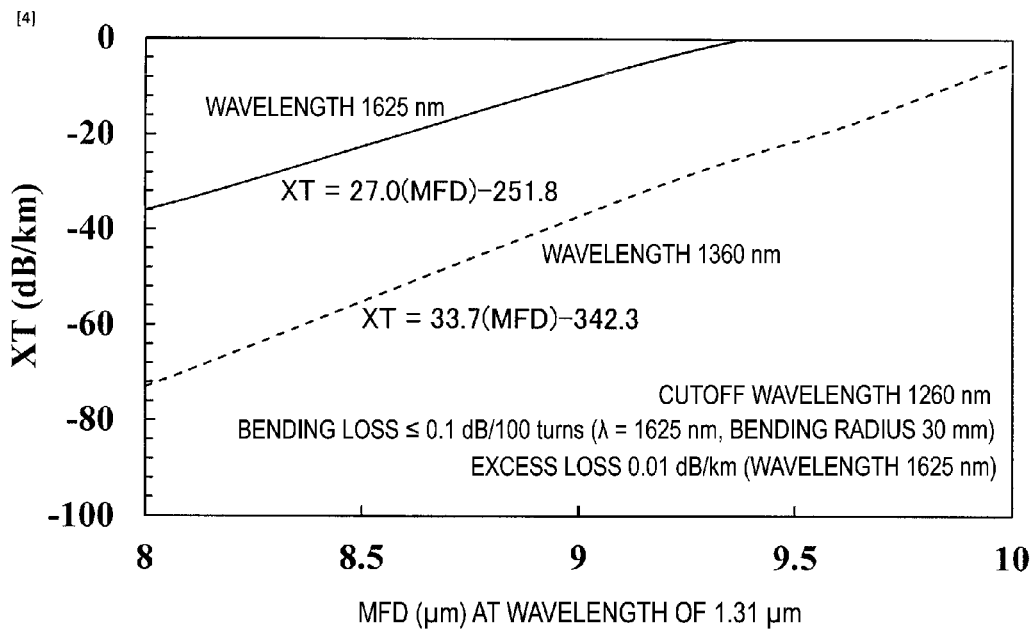
FIG. 4 is a characteristic diagram illustrating an example of a relationship between the MFD and XT at a wavelength of 1310 nm of the multi-core optical fiber according to the present disclosure.

FIG. 4 illustrates a relationship between the MFD and the maximum XT at a wavelength of 1310 nm in the MCF of the present disclosure, which satisfies the requirements illustrated in FIG. 3. Note that the MFD at a wavelength of 1310 nm of the SMF currently most commonly used is determined to be within a range of 8.2 to 9.6 μm according to the International Standard. In general, a mismatch of the MFD between the connecting optical fibers leads to an increase in connection loss, and thus the MFD of the present embodiment at a wavelength of 1310 nm of the MCF is also preferably set within a range of 8.2 to 9.6 μm.

The solid line in the drawing indicates a calculation result when the upper limit wavelength of the wavelength band used is set to 1625 nm. It can be seen from FIG. 4 that the XT increases with an increase in the MFD and the relationship therebetween can be approximated by Expression (4). Note that the XT is saturated in a region of 0 dB/km or greater.

(Expression 4)

$$XT \leq 27.0 MFD - 251.8 \quad (4)$$

Here, the special deterioration of transmission due to the XT in the MCF depends on a transmission method. According to Non Patent Literature 7, crosstalk of −16 dB, −24 dB, and −32 dB or less is required for the transmission methods of QPSK, 16QAM, and 64QAM, respectively. In the case of a multi-core optical fiber, inter-core crosstalk is the sum of crosstalk components to any core from the other cores, and crosstalk at any distance can be calculated by XT+10 log(L) based on crosstalk per unit distance (dB/km) and a distance L (km).

For example, in order to perform 1000 to 10000 km transmission using a 16QAM signal format, the crosstalk of the multi-core fiber needs to be −54 to −64 dB/km or less. In other words, it can be seen from FIG. 4 that the first multi-core optical fiber does not enable 1000 to 10000 km transmission using a 16QAM signal format at a wavelength of 1625 nm, regardless of the MFD at a wavelength of 1310 nm.

On the other hand, it can be seen from FIG. 4 that when the first multi-core optical fiber achieves an MCF for L=1 km transmission using a QPSK signal, the MFD at a wavelength of 1310 nm can be set in a range of 8.75 μm or less.

Furthermore, when it is desired to achieve transmission using a QPSK signal with an MFD of 9 μm at a wavelength of 1310 nm, XT at a wavelength of 1625 nm of this MFD is −9 dB/km. Thus, it can be found that the maximum transmission distance should be 0.2 km or less in order to achieve an XT characteristic of −16 dB/km required for the transmission using the QPSK signal.

Furthermore, the dashed line in FIG. 4 indicates a calculation result when the upper limit wavelength of the wavelength band used is set to 1360 nm. It can be found that a relationship between the MFD at a wavelength of 1310 nm and the XT at a wavelength of 1360 nm can be described by Expression (5).

(Expression 5)

$$XT \leq 33.7 MFD - 342.3 \quad (5)$$

As described above, it can be seen from FIG. 4 that by using the 8.2 to 9.6 μm MFD characteristics matched with the existing SMF standard to set a transmission distance appropriately, the MCF can achieve a transmission system capable of supporting any of QPSK, 16QAM, and 64QAM. Thus, when the above-described relational expression (4) or (5) is used and the upper limit of the wavelength band used is set to 1625 nm or 1360 nm, a relationship between the XT and the MFD that achieves a desired transmission system can be derived.

As described above, it is possible to define, using the relational expressions (2), (3), and (4), the relationship between the OCT, Λ, and MFD in the MCF that has a cutoff wavelength, a bending loss, and MFD characteristics equivalent to those of the existing SMF, and that achieves the desired XT characteristics in the wavelength range of 1260 nm to 1625 nm with the excess loss at a wavelength of 1625 nm being 0.01 dB/km or less.

Similarly, it is possible to define, using the relational expressions (2), (3), and (5), the relationship between the OCT, Λ, and MFD in the MCF of the present application that has a cutoff wavelength, a bending loss, and MFD characteristics equivalent to those of the existing SMF, and that achieves the desired XT characteristics in the wavelength range of 1260 nm to 1360 nm with the excess loss at a wavelength of 1625 nm being 0.01 dB/km or less.

Second Embodiment

A second multi-core optical fiber will be described as a second embodiment.

Figure 5:
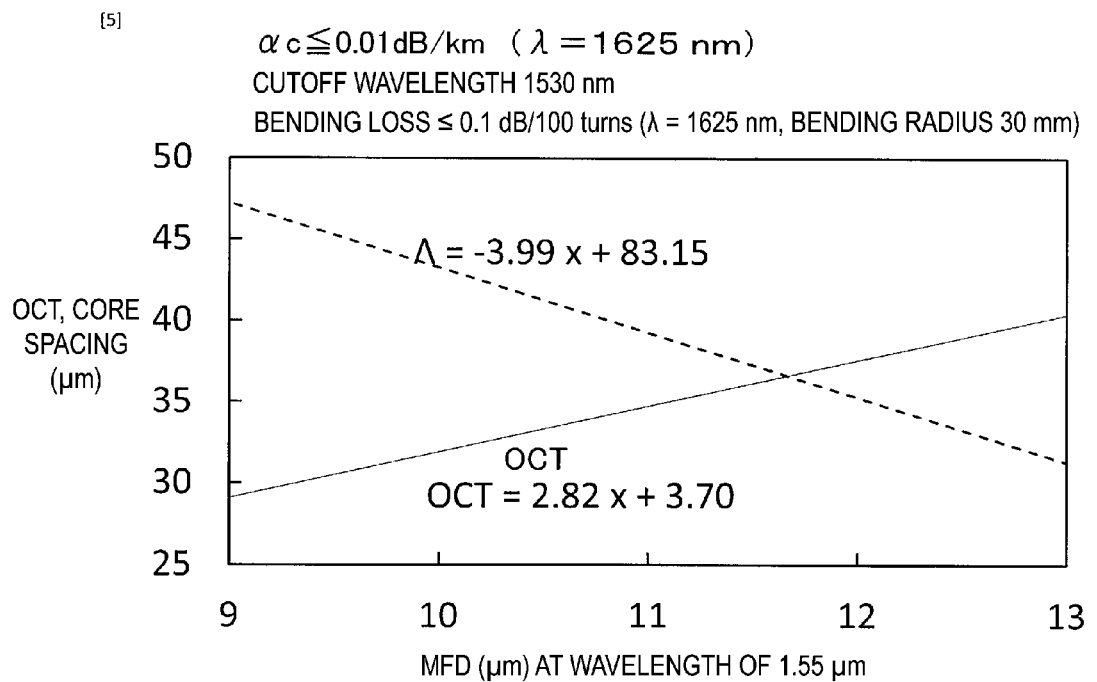
FIG. 5 is a characteristic diagram illustrating a relationship between an MFD, an OCT, and Λ at a wavelength of 1550 nm of the multi-core optical fiber according to the present disclosure.

The MCF of the present embodiment has a cutoff wavelength set to 1530 nm. FIG. 5 illustrates a relationship between an MFD and an OCT at a wavelength of 1550 nm. Here, as an example, a wavelength band used is set to 1530 nm to 1625 nm. That is, a cutoff wavelength is set to 1530 nm and αc at a wavelength of 1625 nm is set to 0.01 dB/km or less. In addition, a bending loss is set to be the same as that of an existing SMF, and a value at a wavelength of 1625 nm and a bending radius of 30 mm is set to 0.1 dB/100 turns or less.

At this time, as illustrated in FIG. 2, a relationship between the core radius and the relative refractive index difference satisfying the requirements of the cutoff wavelength, the bending loss, and the MFD can be derived. In FIG. 5, the minimum value of the OCT required to set the αc to 0.01 dB/km or less is indicated by the solid line from conditions of the core radius and the relative refractive index difference satisfying the relationship described above. It can be seen from FIG. 5 that the OCT increases with an increase in the MFD and that its relationship can be approximated by the following relational expression.

(Expression 6)

$$OCT \geq 2.82MFD + 3.7 \quad (6)$$

Here, the dashed line in FIG. 5 represents the upper limit of a center-to-center distance Λ of four cores arranged in a square lattice shape when the cladding diameter is set to 125 μm. It can be seen from FIG. 5 that the relationship between the MFD and Λ can be approximated by the following relational expression.

(Expression 7)

$$\Lambda \leq -3.99MFD + 83.15 \quad (7)$$

Thus, in the MCF of the present application, when the lower limit of the wavelength band used is 1530 nm, the prescribed wavelength of the MFD is 1550 nm, and the αc at a wavelength of 1625 nm is 0.01 dB/km or less, it can be found that setting conditions of the OCT and Λ can be determined from the design center value of the MFD by Expressions (6) and (7).

In other words, the second multi-core optical fiber includes four cores arranged in a square lattice shape along a longitudinal direction and each having a step-index type refractive index distribution with a radius a. Further, the second multi-core optical fiber is a multi-core optical fiber provided on an outer peripheral portion of the cores. The second multi-core optical fiber includes a cladding region having a lower refractive index than that of the core and a diameter of 125±1 μm, where an absolute value of a relative refractive index difference between the core and the cladding region is Δ. In the second multi-core optical fiber, a mode field diameter MFD at a wavelength of 1550 nm is 9 to 12 μm. In the second multi-core optical fiber, a bending loss at a wavelength of 1625 nm and a bending radius of 30 mm is 0.1 dB/100 turns or less. In the second multi-core optical fiber, a cutoff wavelength is 1530 nm or less. In the second multi-core optical fiber, the four cores are arranged so that a relationship between a minimum distance (OCT) from the center of the core to an outer periphery of the cladding region, a minimum value Λ of spacing of the cores, and the MFD at a wavelength of 1550 nm satisfies Number (6) and Expression (7). In the second multi-core optical fiber, the radius a of the core and the relative refractive index difference Δ between the core and the cladding region are set.

Figure 6:
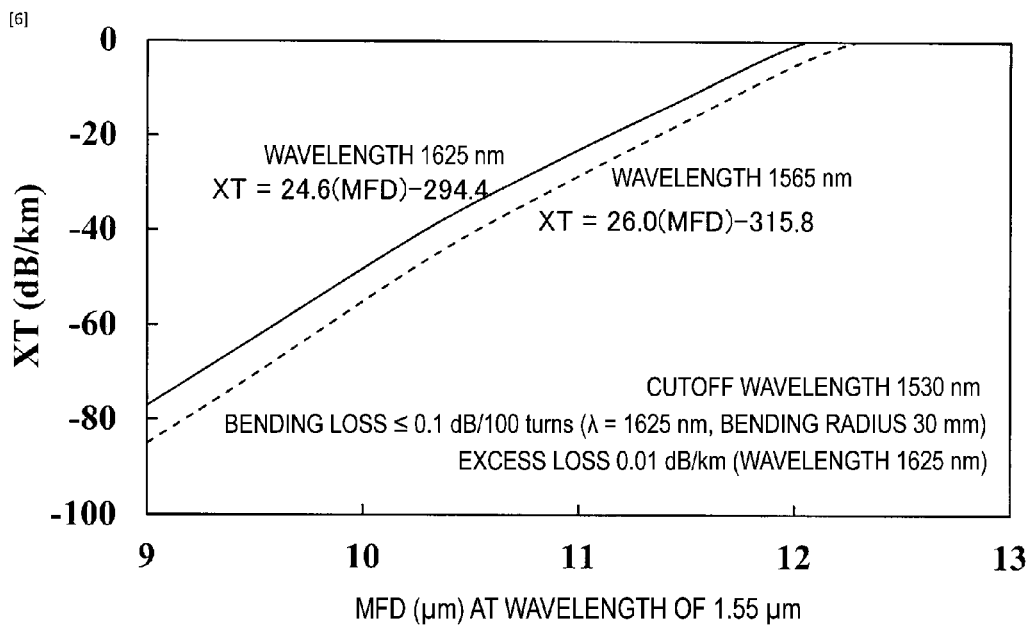
FIG. 6 is a characteristic diagram illustrating an example of a relationship between the MFD and XT at a wavelength of 1550 nm of the multi-core optical fiber according to the present disclosure.

FIG. 6 illustrates a relationship between the MFD and the maximum XT at a wavelength of 1550 nm in the MCF of the present disclosure, which satisfies the requirements illustrated in FIG. 5. Note that the MFD at a wavelength of 1550 nm of the SMF for high speed transmission that is currently commonly used is in a range of approximately 9 to 12 μm. In general, the mismatch of the MFD between the connecting optical fibers leads to an increase in connection loss, so that the MFD at a wavelength of 1550 nm of the MCF of the present embodiment is also preferably set within a range of 9 to 12 μm.

The solid line in the drawing indicates a calculation result when the upper limit wavelength of the wavelength band used is set to 1625 nm. It can be seen from FIG. 6 that the XT increases with an increase in the MFD and that the relationship therebetween can be approximated by Expression (8). Note that the XT is saturated in a region of 0 dB/km or greater.

(Expression 8)

$$XT \leq 24.6MFD - 294.4 \quad (8)$$

In addition, the dashed line in FIG. 6 indicates a relationship when the upper limit wavelength of the wavelength band used is 1565 nm, and it can be found that a relationship between the MFD at a wavelength of 1550 nm and the XT at a wavelength of 1565 nm can be described by Expression (9).

(Expression 9)

$$XT \leq 26.0MFD - 315.8 \quad (9)$$

Similar to the MCF described in the first embodiment, it can be seen from FIG. 6 that by using the 9 to 12 μm MFD characteristics highly matched with the existing SMF for high speed transmission to set a transmission distance appropriately, the MCF of the present embodiment also can achieve a transmission system capable of supporting any of QPSK, 16QAM, and 64QAM. Thus, when the above-described relational expression (8) or (9) is used and the upper limit of the wavelength band used is set to 1625 nm or 1565 nm, a relationship between the XT and the MFD that achieves a desired transmission system can be derived.

As described above, it is possible to define, using the relational expressions (6), (7), and (8), the relationship between the OCT, Λ, and MFD in the MCF that has a cutoff wavelength, a bending loss, and MFD characteristics equivalent to those of the existing SMF for high speed transmission, and that achieves the desired XT characteristics in the wavelength range of 1530 nm to 1625 nm with the excess loss at a wavelength of 1625 nm being 0.01 dB/km or less.

Similarly, it is possible to define, using the relational expressions (6), (7), and (9), the relationship between the OCT, Λ, and MFD in the MCF that has a cutoff wavelength, a bending loss, and MFD characteristics equivalent to those of the existing SMF, and that achieves the desired XT characteristics in the wavelength range of 1530 nm to 1565 nm with the excess loss at a wavelength of 1625 nm being 0.01 dB/km or less.

Design Method of Optical Fiber

Figure 7:
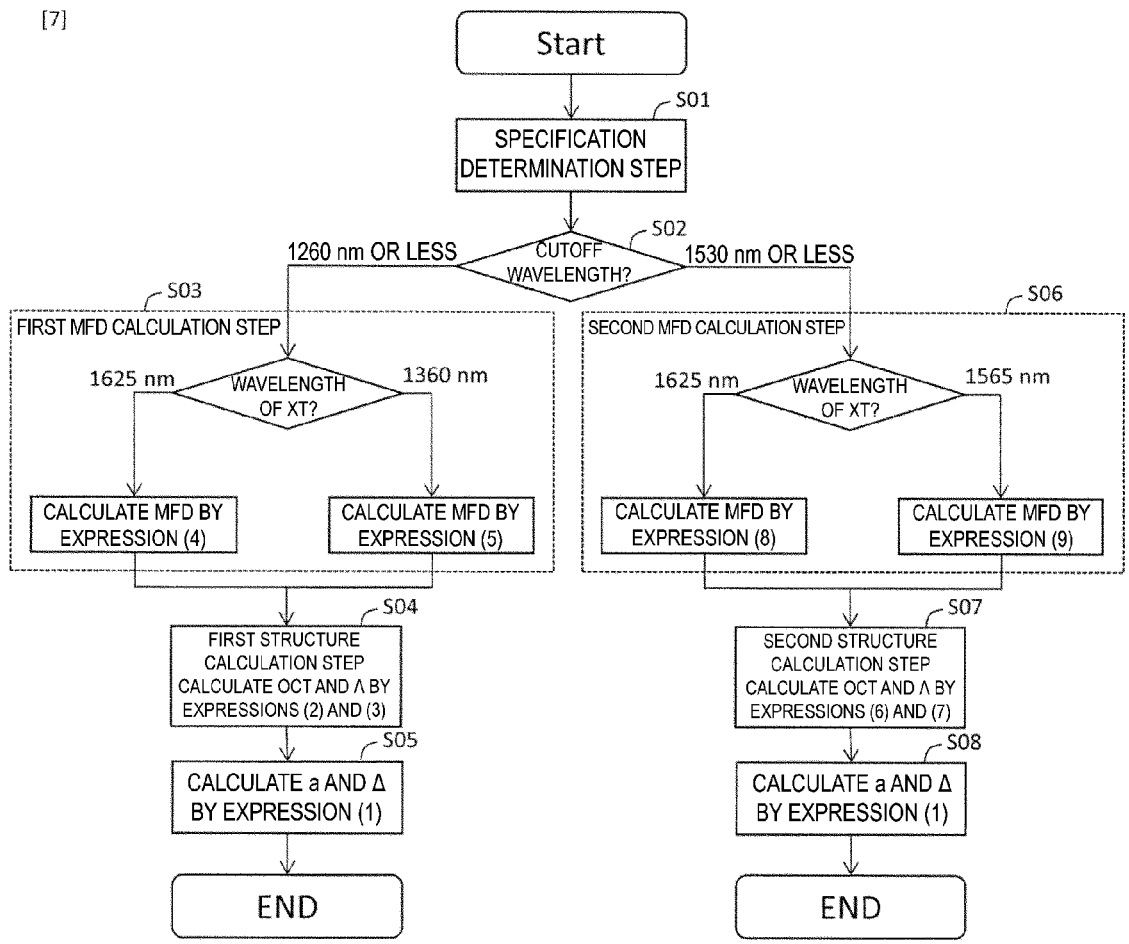
FIG. 7 is a flowchart illustrating a design method of the multi-core optical fiber according to the present disclosure.

FIG. 7 is a flowchart illustrating a design method of the MCF described in each of the first and second embodiments. The design method performs steps described below.

Step S01 is a specification determination step of determining a cutoff wavelength and a total value XT of crosstalk of a unit length which are required for the multi-core optical fiber, the crosstalk being received any core of the cores from the other cores.

In step S02, the process is assigned to step S03 or step S06 according to the cutoff wavelength determined in the specification determination step S01.

Step S03 is a process performed when it is determined in step S02 that the cutoff wavelength determined in the specification determination step S01 is 1260 nm or less. Step S03 is a first MFD calculation step of calculating a mode field diameter (MFD) at a wavelength of 1310 nm by using an expression selected according to the following selection condition. This selection condition is a condition in which, when the total value XT of the crosstalk of the unit length is a value at a wavelength of 1625 nm, Expression (4) is selected, and when the total value XT of the crosstalk of the unit length is a value at a wavelength of 1360 nm, Expression (5) is selected.

Step S04 is a first structure calculation step of calculating a minimum distance (OCT) from the center of the core to an outer periphery of the cladding region and a minimum value Λ of spacing of the cores by substituting the MFD calculated in the first MFD calculation step S03 into Expressions (2) and (3).

Step S06 is a process performed when it is determined in step S02 that the cutoff wavelength determined in the specification determination step S01 is 1530 nm or less. Step S06 is a second MFD calculation step of calculating a mode field diameter (MFD) at a wavelength of 1550 nm using an expression selected according to the following selection condition. This selection condition is a condition in which, when the total value XT of the crosstalk of the unit length is a value at a wavelength of 1625 nm, Expression (8) is used, and when the total value XT of the crosstalk of the unit length is a value at a wavelength of 1565 nm, Expression (9) is used.

Step S07 is a second structure calculation step of calculating a minimum distance (OCT) from the center of the core to the outer periphery of the cladding region and a minimum value Λ of the spacing of the cores by substituting the MFD calculated in the second MFD calculation step S06 into Expressions (6) and (7).

The design method further includes calculating the core radius a and the relative refractive index difference Δ by substituting the MFD calculated in the first MFD calculation step S03 or the second MFD calculation step S06 into Expression (1) (steps S05 and S08).

By arranging cores based on the core radius a, the relative refractive index difference Δ, the minimum value Λ of the spacing of the cores, and the OCT calculated by the design method, it is possible to achieve an MCF including four step-index type cores with a standard cladding diameter and having excellent mass productivity, quality, and yield while meeting the desired specifications.

INDUSTRIAL APPLICABILITY

The multi-core optical fiber according to the present disclosure can be used for optical fibers in an optical communication system.

REFERENCE SIGNS LIST

11: Core
12: Cladding region

The invention claimed is:

1. A multi-core optical fiber comprising:
    four cores, each of the four cores having a step-index type refractive index distribution with a radius a; and
    a cladding region having a lower refractive index than that of each core, a diameter of 125±1 μm and an absolute value of a relative refractive index difference between each core and the cladding region being Δ, and provided on an outer peripheral portion of each core, wherein
    a mode field diameter (MFD) at a wavelength of 1310 nm is 8.2 to 9.6 μm,
    a bending loss at a wavelength of 1625 nm and a bending radius of 30 mm is 0.1 dB/100 turns or less,
    a cutoff wavelength is 1260 nm or less, and
    the four cores are arranged, the radius a of each core is set, and the relative refractive index difference Δ between each core and the cladding region are set so that a relationship between a minimum distance (OCT) from a center of each core to an outer periphery of the cladding region, a minimum value Λ of spacing between the cores, and the MFD at a wavelength of 1310 nm satisfies Formula C1:

[Formula C1]

$$OCT \geq 3.73 MFD + 3.43$$

$$\Lambda \leq -5.28 MFD + 83.54 \quad (C1).$$

2. The multi-core optical fiber according to claim 1, wherein a relationship between a total value XT of crosstalk of a unit length at a wavelength of 1625 nm and the MFD at a wavelength of 1310 nm satisfies Formula C2, the crosstalk being received by any core of the cores from other cores:

[Formula C2]

$$XT \geq 27.0 MFD - 251.8 \quad (C2).$$

3. The multi-core optical fiber according to claim 1, wherein a relationship between a total value XT of crosstalk of a unit length at a wavelength of 1360 nm and the MFD at a wavelength of 1310 nm satisfies Formula C3, the crosstalk being received by any core of the cores from other cores:

[Formula C3]

$$XT \geq 33.7 MFD - 342.3 \quad (C3).$$

4. A multi-core optical fiber comprising:

four cores, each of the four cores having a step-index type refractive index distribution with a radius a; and a cladding region having a lower refractive index than that of each core, a diameter of 125±1 μm and an absolute value of a relative refractive index difference between each core and the cladding region being Δ, and provided on an outer peripheral portion of each core, wherein a mode field diameter MFD at a wavelength of 1550 nm is 9 to 12 μm, a bending loss at a wavelength of 1625 nm and a bending radius of 30 mm is 0.1 dB/100 turns or less, a cutoff wavelength is 1530 nm or less, and the four cores are arranged, the radius a of each core is set, and the relative refractive index difference Δ between each core and the cladding region are set so that a relationship between a minimum distance (OCT) from a center of each core to an outer periphery of the cladding region, a minimum value Λ of spacing between the cores, and the MFD at a wavelength of 1550 nm satisfies Formula C4:

[Formula C4]

$$OCT \geq 2.82 MFD + 3.7$$

$$\Lambda \leq -3.99 MFD + 83.15 \tag{C4}$$

5. The multi-core optical fiber according to claim 4, wherein a relationship between a total value XT of crosstalk of a unit length at a wavelength of 1625 nm and the MFD at a wavelength of 1550 nm satisfies Formula C5, the crosstalk being received by any core of the cores from other cores:

[Formula C5]

$$XT \geq 24.6 MFD - 294.8 \tag{C5}$$

6. The multi-core optical fiber according to claim 4, wherein a relationship between a total value XT of crosstalk of a unit length at a wavelength of 1565 nm and the MFD at a wavelength of 1550 nm satisfies Formula C6, the crosstalk being received by any core of the cores from other cores:

[Formula C6]

$$XT \geq 26.0 MFD - 315.8 \tag{C6}$$

7. A design method of a multi-core optical fiber, the multi-core optical fiber including:

four cores, each of the four cores having a step-index type refractive index distribution with a radius a; and a cladding region having a lower refractive index than that of each core, a diameter of 125±1 μm and an absolute value of a relative refractive index difference between each core and the cladding region being Δ, and provided on an outer peripheral portion of each core, the method comprising:

determining specifications which are a cutoff wavelength required for the multi-core optical fiber and a total value XT of crosstalk of a unit length, the crosstalk being received by any core of the cores from other cores;

calculating a first mode field diameter (MFD) at a wavelength of 1310 nm by using Formula C2 when the cutoff wavelength is 1260 nm or less and the total value XT of the crosstalk of the unit length is a value at a wavelength of 1625 nm, or by using Formula C3 when the cutoff wavelength is 1260 nm or less and the total value XT of the crosstalk of the unit length is a value at a wavelength of 1360 nm;

calculating a first structure which are a minimum distance (OCT) from a center of each core to an outer periphery of the cladding region and a minimum value Λ of spacing between the cores by substituting the first MFD into Formula C1;

calculating a second mode field diameter (MFD) at a wavelength of 1550 nm by using Formula C5 when the cutoff wavelength is 1530 nm or less and the total value XT of the crosstalk of the unit length is a value at a wavelength of 1625 nm, or by using Formula C6 when the cutoff wavelength is 1530 nm or less and the total value XT of the crosstalk of the unit length is a value at a wavelength of 1565 nm; and calculating a second structure which are a minimum distance (OCT) from the center of each core to the outer periphery of the cladding region and a minimum value Λ of the spacing between the cores by substituting the second MFD into Formula C4

[Formula C1]

$$OCT \geq 3.73 MFD + 3.43$$

$$2a < \Lambda \leq -5.28 MFD + 83.54 \tag{C1}$$

[Formula C2]

$$XT \geq 27.0 MFD - 251.8 \tag{C2}$$

[Formula C3]

$$XT \geq 33.7 MFD - 342.3 \tag{C3}$$

[Formula C4]

$$OCT \geq 2.82 MFD + 3.7$$

$$2a < \Lambda \leq -3.99 MFD + 83.15 \tag{C4}$$

Formula C5]

$$XT \geq 24.6 MFD - 294.8 \tag{C5}$$

Formula C6]

$$XT \geq 26.0 MFD - 315.8 \tag{C6}$$

* * * * *